US009294468B1

(12) United States Patent
Kilbourn

(10) Patent No.: US 9,294,468 B1
(45) Date of Patent: Mar. 22, 2016

(54) APPLICATION-LEVEL CERTIFICATES FOR IDENTITY AND AUTHORIZATION

(71) Applicant: Google Inc., Mountain View, CA (US)

(72) Inventor: Timothy Kilbourn, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 157 days.

(21) Appl. No.: 13/913,572

(22) Filed: Jun. 10, 2013

(51) Int. Cl.
| G06F 7/04 | (2006.01) |
| G06F 15/16 | (2006.01) |
| G06F 17/30 | (2006.01) |
| H04L 29/06 | (2006.01) |
| H04L 9/32 | (2006.01) |
| H04W 12/06 | (2009.01) |
| H04L 9/00 | (2006.01) |
| H04L 9/08 | (2006.01) |
| G06F 21/33 | (2013.01) |
| G06F 21/00 | (2013.01) |

(52) U.S. Cl.
CPC .......... H04L 63/0823 (2013.01); H04L 9/3263 (2013.01); G06F 21/00 (2013.01); G06F 21/33 (2013.01); H04L 9/00 (2013.01); H04L 9/006 (2013.01); H04L 9/0825 (2013.01); H04L 9/32 (2013.01); H04L 63/00 (2013.01); H04L 63/10 (2013.01); H04W 12/06 (2013.01)

(58) Field of Classification Search
CPC ............. H04L 9/32; H04L 63/10; H04L 9/00; H04L 9/3263; H04L 9/006; H04L 9/0825; H04L 63/00; H04L 63/0823; H04W 12/06; G06F 21/00; G06F 21/33
USPC ............. 726/6, 7, 27; 713/156, 168, 173, 175
See application file for complete search history.

(56) References Cited

U.S. PATENT DOCUMENTS

| 6,463,535 B1 * | 10/2002 | Drews ................... G06F 9/4416 713/176 |
| 7,363,022 B2 * | 4/2008 | Whelan et al. ................ 455/411 |
| 7,512,802 B2 | 3/2009 | Minemura |
| 7,805,755 B2 | 9/2010 | Brown et al. |
| 8,843,750 B1 * | 9/2014 | Sokolov ........................ 713/175 |
| 2004/0002902 A1 * | 1/2004 | Muehlhaeuser ................ 705/26 |
| 2005/0287990 A1 * | 12/2005 | Mononen .............. G06F 21/335 455/411 |
| 2006/0294381 A1 * | 12/2006 | Mitchell ................. H04L 63/06 713/173 |
| 2008/0249938 A1 * | 10/2008 | Drake-Stoker .................. 705/44 |

(Continued)

OTHER PUBLICATIONS

"Certificate-based authorization policy in a PKI environment", Thompson et al.; ACM Journal; 2003.*

*Primary Examiner* — Jayesh Jhaveri
(74) *Attorney, Agent, or Firm* — Morris & Kamlay LLP

(57) ABSTRACT

Disclosed is a method in which a portable device processor may generate an application-level certificate for an application installed on the portable device. The processor may, for example, insert an application name in a package name field of a self-signed device-level certificate of the portable device to generate an application-level self-signed certificate. A request to authenticate the application may be forwarded to the controller. The request may include the application-level certificate. The portable device processor may receive a request to form a secure communication channel between the portable device and the controller based on the authenticated application-level certificate. A controller may respond to a portable device request for services by authenticating an application-level certificate provided by the portable device so requested services may be securely provided to the portable device.

24 Claims, 3 Drawing Sheets

(56) References Cited

U.S. PATENT DOCUMENTS

| | | | |
|---|---|---|---|
| 2009/0187980 A1* | 7/2009 | Tung | H04W 12/06 726/6 |
| 2009/0193522 A1 | 7/2009 | Ishikawa et al. | |
| 2009/0240936 A1* | 9/2009 | Lambiase | H04L 63/0272 713/156 |
| 2011/0319056 A1* | 12/2011 | Toy et al. | 455/412.2 |
| 2013/0031371 A1* | 1/2013 | McLellan | G06F 21/575 713/182 |
| 2013/0054962 A1* | 2/2013 | Chawla | H04L 9/321 713/156 |
| 2013/0078948 A1* | 3/2013 | Pecen | H04L 63/0823 455/411 |
| 2013/0091353 A1* | 4/2013 | Zhang | H04L 9/3268 713/156 |
| 2013/0132717 A1* | 5/2013 | Brand et al. | 713/156 |
| 2014/0115676 A1* | 4/2014 | Coghlan et al. | 726/6 |
| 2014/0289511 A1* | 9/2014 | Tuch | H04L 63/0823 713/156 |
| 2014/0298420 A1* | 10/2014 | Barton et al. | 726/4 |

\* cited by examiner

APPLICATION-LEVEL CERTIFICATES FOR IDENTITY AND AUTHORIZATION

BACKGROUND

Portable devices may be incorporated into a network, such as a home automation network, residential local area network and the like, and may have access to commonly secured network controllers and data. Portable devices also may have access to hundreds of thousands of applications that may be executed on the portable devices to perform various functions. However, there may be applications, such as rogue application, running on the portable device that may be unauthenticated and/or malicious. A rogue application operating on a portable device may be capable of assuming control of the portable device, transmitting data from the portable device, and/or improperly causing a controller to allow the application unauthorized access to the network controllers and data that are commonly secured. For example, a rogue or other unauthorized application may mimic a home security application and provide access to an unauthorized party.

BRIEF SUMMARY

According to an implementation of the disclosed subject matter, a process may include receiving a request from an application executing on a portable device. The request from the application may include an application-level certificate. Based on the application-level certificate, the requesting application may be authenticated. In response to the authentication, a handshaking process to establish a secure communication channel with the portable device may begin using public key information in the application-level certificate. A secure communication channel may be established between the processor and the portable device.

According to an implementation of the disclosed subject matter, a portable device processor may generate an application-level certificate for an application installed on the portable device. The processor may insert a package name in an application name field of the application-level certificate that is signed by the device level certificate of the portable device. A request to authenticate the application at a controller may be forwarded to the controller. The request may include the application-level certificate. The portable device processor may receive a request from a controller to form a secure communication channel between the portable device and the controller based on the authenticated application-level certificate.

Advantageously, the disclosed features reduce a need to generate, distribute, and update long-lived certificates by a central authority or other centralized entity for every application included on portable devices and on the network system. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
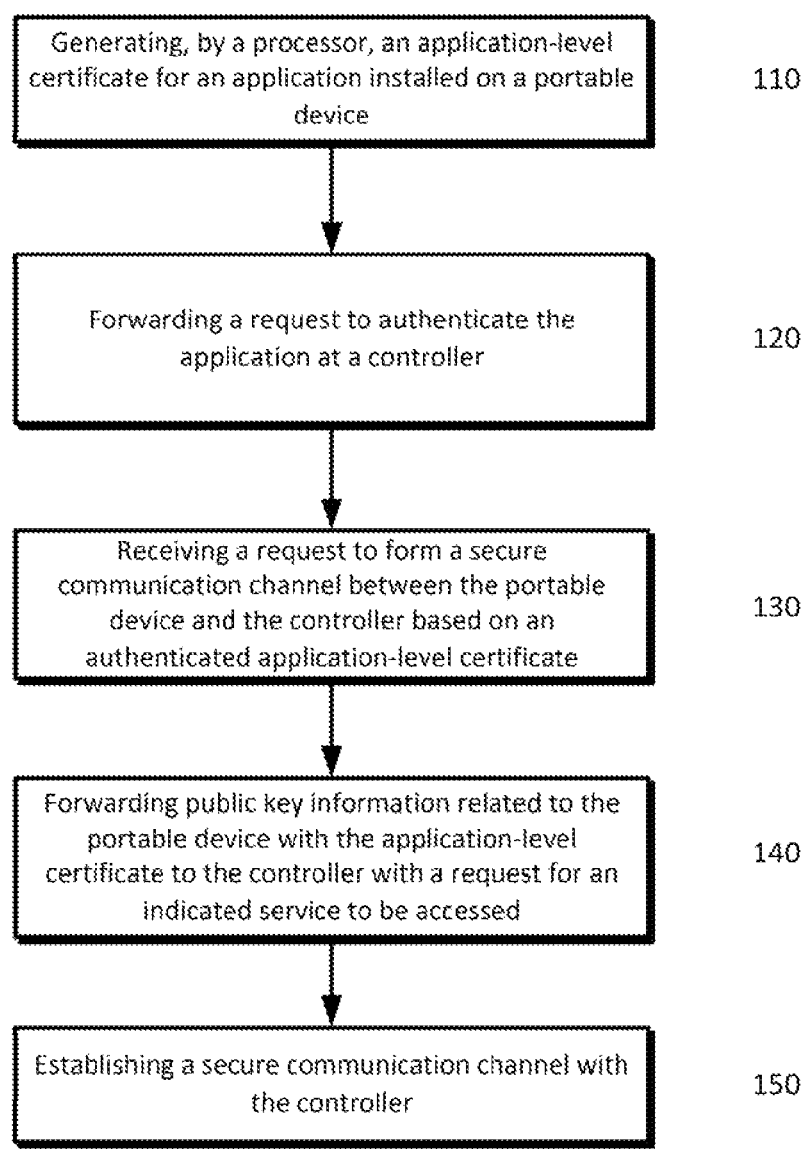
FIG. 1 shows a flowchart according to an implementation of the disclosed subject matter.

A network that may permit portable devices, such as smartphones, digital media distribution devices, tablets, laptops, and the like, to access network controllers, services, data, and so on. For example, the devices may have access to different types of services, such as a music playing service, a video playing service, a gaming service, a home control service, electronic content services, such as news, entertainment, magazine and other information, or other services that may be provided by a controller or services provider.

To allow communication with a network controller, the portable devices may be provided with a device-level certificate that can be used to verify that the device can be trusted by the controller. Each device in the network may have a self-signed device-level certificate that may be or operate as a "root" certificate in the network system. A list of "trusted" certificates in a network or other region may be distributed by a cloud server or other device, or may be maintained by the controller. For example, dedicated servers may be used to distribute the trusted certificates to all of the other devices including portable devices that are authorized to communicate with a specific network device, such as a digital media distribution device. Any such dedicated server may be considered a certificate authority for purposes of the network communication. In addition, any certificates provided by the dedicated servers may be considered to certificates for trusted devices. As an added level of security, each application also may also have a corresponding authentication certificate. This application-level certificate may be used by a receiving device to authenticate that the application is a trusted application, or, in other words, not a rogue application.

In some implementations, a broker service executing on the portable device may coordinate the generation and maintenance of application-level certificates. The brokering service may be a computer program that supports the generation and distribution of device-level and application-level certificates for a device, such as a portable device, or a dedicated device, for example, a music distribution device, connected to a network. For example, the brokering service may hold all of the application-level certificates privately and may have access to the device-level certificate. By holding the application-level certificates private, only the brokering service may have direct access to the application-level certificates, and all other applications or devices must request that the brokering service grant the application access to the application-level certificates. The brokering service may also generate application-level certificates for applications on the portable device. The application-level certificates may expire in a very short amount of time, but may be regenerated as needed. The brokering service may hold a private key for the self-signed device-level certificate for that specific requesting portable device. Each request to access data or applications on the network may include a copy of the application-level certificate. A controller or other device may use the certificate in establishing a secure communication channel, such as a secure sockets layer (SSL) connection, with another device.

In some implementations, an authentication and certificate system as disclosed herein may authenticate different computer applications on a user device to other devices, thereby allowing the authenticated application or more than one authenticated application to use the same services provided by the other devices. The computer applications that use the authentication and certificate service may participate by using the broker service. In order to authenticate different computer applications, the broker service may generate and sign new self-signed certificates for the user device that include an application-level certificate containing a package name of the applications that may use the broker service. The new self-signed application-level certificates may be required from any application that wishes to communicate on the network system through the broker service. For example, an application may attempt to access a service or operation on a device in the system by sending a request. In response, the broker service executing on the device receiving the request may examine the application's certificate to determine if the application is in fact the application it claims to be, if the application is authorized to access the service, if the application is authorized to perform the requested function, and/or the like. The permissions assigned to each application may be specified based on user selection, application type, the accessed data or service, or other criteria.

In some implementations, only the root certificates from the devices themselves may need to be distributed by a trusted party, such as, for example, dedicated servers. The servers that distribute the device root certificates may be considered a trusted certificate authority; however, a central distribution authority generally is not required, though one or more distribution devices or authorities may be used.

FIG. 1 shows a flowchart according to an implementation of the disclosed subject matter. A process 100 may be executed on a processor, which may be in a portable device, such as a smartphone, a tablet, a laptop or similar computing device. Through an application executing on the portable device, the portable device may communicate with a controller to provide control inputs or exchange information. The portable device processor may generate a self-signed certificate that will be forwarded to server, which may distribute the certificate to other devices connected in a network. The portable device processor may also generate an application-level certificate for an application installed on the portable device 110.

The application-level certificate may be generated in response to receiving permission for an application on the portable device to access a service through a controller. Permission may be received though a user or network action. For example, a portable device may be commissioned in the network with the controller, or when installed on the device with user inputs. More specifically, when the application is installed on the portable device, the network may require passwords and other information, such as user preferences, to be input by a user to grant the newly-installed application access to the network and services provided by or through the controller. Alternatively, the fact that the user allowed the application to be installed on the portable device may be considered permission. Once permission is received, the application-level certificate may be generated by the brokering service executing on the portable device processor. For example, the portable device processor may generate an application-level certificate by inserting an application name in a package name field of a self-signed device-level certificate of the portable device. The brokering service may attach private key and public key information to the application-level certificate, and may store the application-level certificate on the portable device. The brokering service executing on a portable device may interact with a network device.

The portable device may obtain a registry of services accessible by the portable device by accessing a local memory, a remote data storage, from another device or server, or by another method. The portable device may forward a request to the controller indicating a service to be accessed by the application that may include an application-level certificate 120. In addition to the application-level certificate, the request may also include public-private key information. The portable device processor may receive a request to form a secure communication channel between the portable device and the controller based on the authenticated application-level certificate 130. Public-private key information related to the portable device may be forwarded with the application-level certificate to the controller with a request for the indicated service to be accessed 140. The portable device may use the public-private key information to establish the secure communication channel with the controller 150. The public-private key information may be used according to known security techniques, such as SSL.

Figure 2:
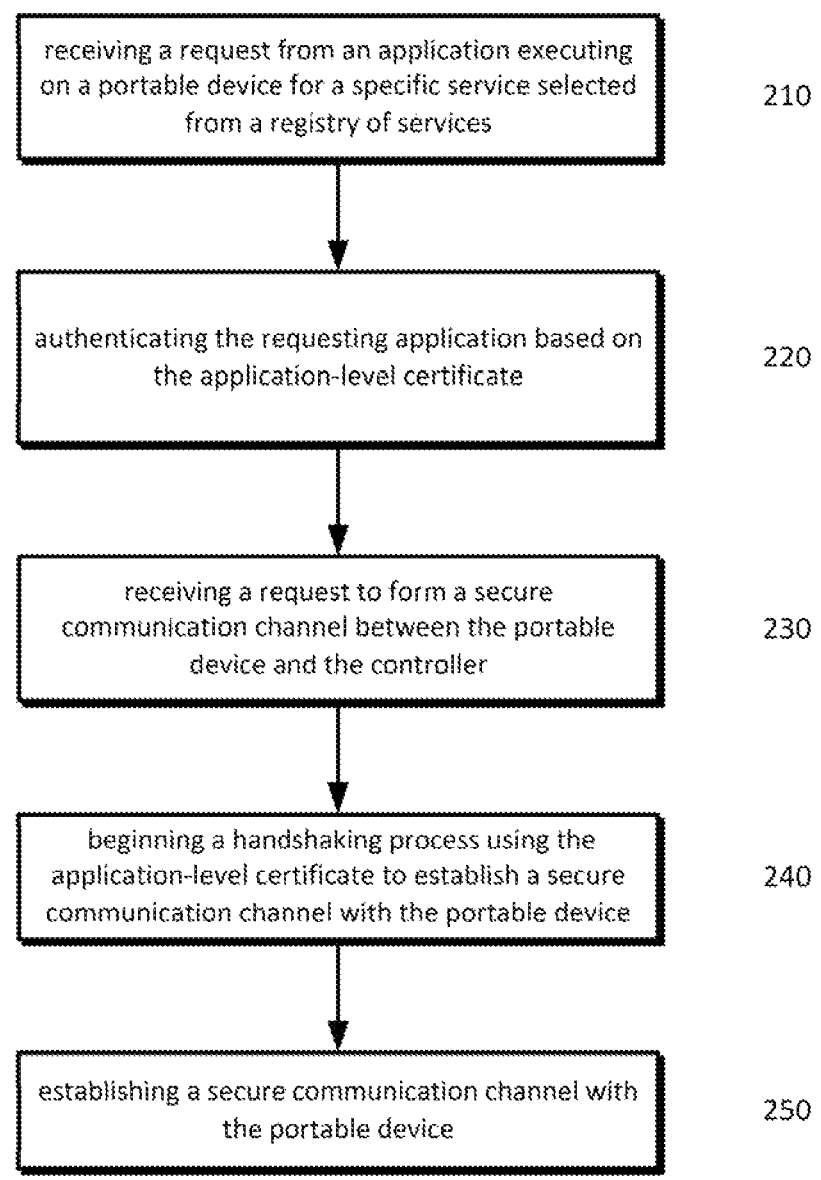
FIG. 2 shows a flowchart according to an implementation of the presently disclosed subject matter.

FIG. 2 shows a flowchart according to an implementation of the presently disclosed subject matter. A process 200 may be executed on a processor, which may be in a network controller, a network gateway, a home local area network server, or a remote server. The process 200 may include receiving a request from an application executing on a portable device 210. The request may be for a specific service selected from a registry of services. The request from the portable device may be a request for a specific service selected from a registry of services. The request may include an application-level certificate that may include information related to the application, and/or information obtained from a self-signed device-level certificate. The information related to the application in the application-level certificate may include public key information for establishing a secure communication channel and a "signature" from the device certificate verifying the application-level certificate as well as other information, such as an indication of the application name, the package name, or some other unique identifier for the sending application. The application-level certificates for all devices connected in a local network may be distributed to every other device connected in the network.

In response to the request, the processor may verify that the portable device is a trusted device based on the self-signed device-level certificate. A trusted device may be a device that has a self-signed certificate that is distributed by or obtained from a server or other device that is considered equivalent to a certificate authority. For example, a portable device may be a device that requires a user input settings information into a network setup application. In addition, the requesting application may be authenticated based on the application-level certificate 220. For example, the processor may authenticate the self-signed device-level certificate is from a trusted source, and, in response to a positive authentication, may begin to authenticate the application-level certificate. The authentication may be performed by retrieving the application name, application identifier, security code, or any indication thereof from a package name field of the self-signed device-level certificate. The authentication may further include comparing information from the application-level certificate of the portable device, such as application name and/or identifier, to information from a list of trusted application-level certificates. The list of trusted application-level certificates may be obtained from a server, a data storage device, a combination of both, another device or the like. A request to form a secure communication channel between the portable device and the controller may be received 230, for example, in response to the authentication. A handshaking process may begin using the public key information in the application-level certificate to establish a secure communication channel with the portable device 240. A secure communication channel, such as an SSL connection, may be established between the processor and the portable device 250. The SSL connection may be established using known techniques and processes. Through the secure communication, the controller may allow only one application access to the requested service based on permission settings related to the requested service. Of course, depending upon permission setting by the user or by default, multiple applications, such as different types of music applications, may be allowed access to the requested music service.

Figure 3:
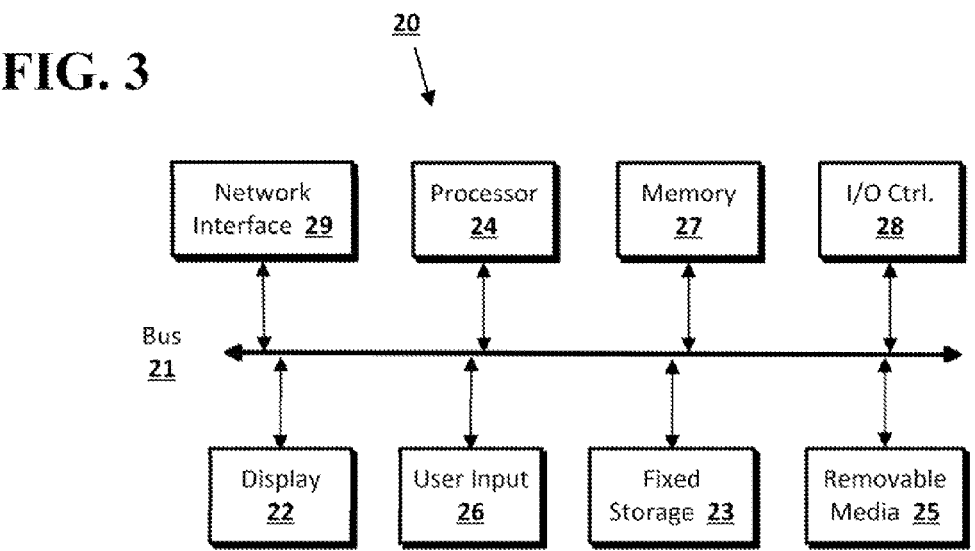
FIG. 3 shows a computer according to an implementation of the disclosed subject matter.

Implementations of the presently disclosed subject matter may be implemented in and used with a variety of component and network architectures. FIG. 3 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 4.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
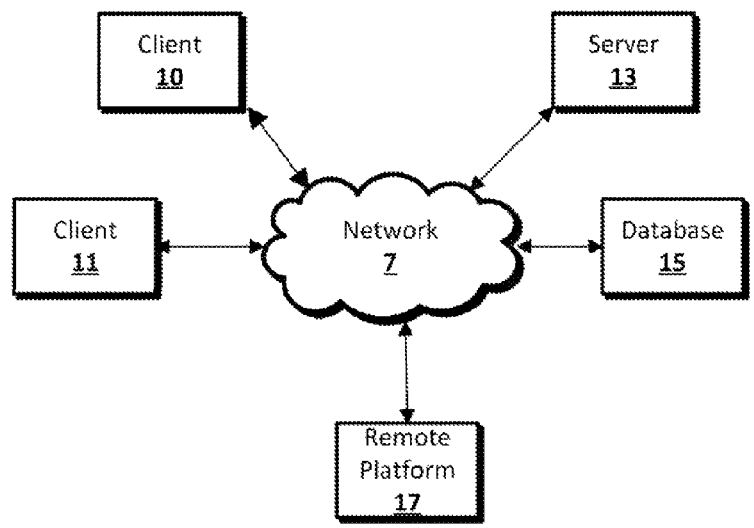
FIG. 4 shows a network configuration according to an implementation of the disclosed subject matter.

FIG. 4 shows an example network arrangement according to an implementation of the disclosed subject matter. One or more clients 10, 11, such as local computers, smart phones, audio distribution devices, video distribution devices, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The server 13 may also be a controller. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Services, such as a music playing service, a video playing service, a gaming service, a home control service, electronic content services, such as news, entertainment, magazine and other information, or other services may be provided by a controller, the server 13, the remote platform 17, or a combination of servers 13 and remote platforms 17 to clients 10, 11. Device-level certificates may be associated with clients 10, 11. Each of clients 10, 11 may generate a self-signed device-level certificate that may be provided to server 13, for example, when the client 10, 11 is commissioned into the network 7. The server 13 may use the information in the respective clients 10, 11 self-signed certificates to authenticate the device. Likewise, if client 10 requests to communicate with client 11, client 11 can obtain a copy of client 10 self-signed certificate from the server 13. Client 11 can authenticate that client 10 is a device that may be "trusted" by, for example, comparing information in the certificate provided by client 10 to information in the copy of client 10 certificate obtained from server 13. Based on the authentication, client 11, which may, for example, be a music distribution device, may allow client 10 to send it music and control signals for distribution by client 11.

The clients 10, 11 may also have access to a plurality of application-level certificates that can be used to verify that an application on another client is authorized to receive information. The application-level certificates, similar to the self-signed device-level certificates, may be distributed to all devices in the network, or may be maintained on a server, such as server 13. For example, if an application executing on client 10 sends a request to use a music distribution service or other service provided by client 11, the application on client 10 may send an application-level certificate with the request. The client 11 may receive the request and the application-level certificate. Depending upon whether the client 11 stores copies of the application-level certificates for all applications in the network including those applications on portable devices or accesses a list of applications on a dedicated server, such as server 13, the client 11 will authorize the application by a comparison of the received application-level certificate to those stored on or accessible by client 11. With a successful verification, the client 11 may respond to the client 10 request. Communication between the clients 10, 11 may be through a secure communication path established based on information included in the application-level certificate.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method, comprising:
receiving a request from an application executing on a portable device, wherein the request includes an application-level certificate generated in the portable device by a portable device processor of the portable device, wherein the application-level certificate comprises at least a portion of a self-signed device-level certificate generated at the portable device and associated with the portable device, and wherein the request includes information obtained from the self-signed device-level certificate;

authenticating the requesting application based on the application-level certificate, wherein the application-level certificate includes public key information for establishing a secure communication channel;

in response to the authentication, beginning a handshaking process using the public key information in the application-level certificate to establish a secure communication channel with the portable device; and establishing a secure communication channel with the portable device.

2. The method of claim 1, wherein the request includes a request for a specific service selected from a registry of services.

3. The method of claim 1, further comprising:
receiving from the portable device a request for services, wherein the request includes a self-signed device-level certificate;
verifying that the portable device is a trusted device based on the self-signed device-level certificate;
delivering a registry of services available to the portable device.

4. The method of claim 1, wherein application-level certificates for all devices connected in a local network are distributed to every other device connected in the local network.

5. The method of claim 2, further comprising:
allowing only one application access to the requested service based on permission settings related to the requested service.

6. The method of claim 1, wherein authenticating the requesting application comprises:
comparing the application-level certificate of the portable device to a list of trusted application-level certificates.

7. The method of claim 1, further comprising:
retrieving a list of trusted device-level certificates from a data storage device.

8. The method of claim 1, wherein the application-level certificate comprises a self-signed certificate associated with the portable device, the self-signed certificate comprising a package name field storing a name of the application.

9. A method comprising:
generating in a portable device, by a portable device processor of the portable device, an application-level certificate for an application installed on the portable device by inserting a name of a package in an application name field of the application-level certificate that is signed by a device-level certificate of the portable device, wherein the device-level certificate is generated and self-signed at the portable device;

forwarding to a controller a request to authenticate the application, the request including the application-level certificate with public key information related to the portable device;

receiving a request from the controller to form a secure communication channel between the portable device and the controller based on the authenticated application-level certificate, wherein the request indicates that the application has been authenticated based on the application-level certificate; and establishing the secure communication channel with the controller, wherein the controller uses the public key information to establish the secure communication channel.

10. The method of claim 9, further comprising:
receiving a registry of services accessible by the portable device;
indicating a service to be accessed by the portable device;

forwarding public key information related to the portable device with the application-level certificate to the controller with a request for the indicated service to be accessed; and using the public key information to establish the secure communication channel.

11. The method of claim 9, wherein generating the application-level certificate, comprises:

receiving permission for an application on the portable device to access a service;

generating the application-level certificate by a brokering service executing on the portable device processor;

attaching private key and public key information to the application-level certificate by the brokering service; and storing the application-level certificate on the portable device.

12. The method of claim 11, wherein the portable device is commissioned in a network with the controller.

13. A system comprising:

a controller comprising a processor and a memory with instructions stored therein, the processor configured to execute the instructions to: receive a request from an application executing on a portable device, wherein the request includes an application-level certificate generated in the portable device by a portable device processor of the portable device, wherein the application-level certificate comprises at least a portion of a self-signed device level certificate generated at the portable device and associated with the portable device, and wherein the request includes information obtained from the self-signed device level certificate; authenticate the requesting application based on the application-level certificate, wherein the application-level certificate includes public key information for establishing a secure communication channel; in response to the authentication, beginning a handshaking process using the public key information in the application-level certificate to establish a secure communication channel with the portable device; establish a secure communication channel with the portable device.

14. The system of claim 13, wherein the request includes a request for a specific service selected from a registry of services.

15. The system of claim 13, wherein the processor is further configured to receive from the portable device a request for services, wherein the request includes a self-signed device-level certificate, verify that the portable device is a trusted device based on the self-signed device-level certificate, and deliver a registry of services available to the portable device.

16. The system of claim 13, wherein application-level certificates for all devices connected in a local network are distributed to every other device connected in the local network.

17. The system of claim 14, wherein the processor is further configured to allow only one application access to the requested service based on permission settings related to the requested service.

18. The system of claim 13, wherein the processor is further configured to authenticate the requesting application comprises by comparing the application-level certificate of the portable device to a list of trusted application-level certificates.

19. The system of claim 13, wherein the processor is further configured to retrieve a list of trusted device-level certificates from a data storage device.

20. The system of claim 13, wherein the application-level certificate comprises a self-signed certificate associated with the portable device, the self-signed certificate comprising a package name field storing a name of the application.

21. A portable device comprising:

a portable device processor and a memory with instructions stored therein, the portable device processor configured to execute the instructions to: generate an application-level certificate for an application installed on the portable device by inserting a name of a package in an application name field of the application-level certificate that is signed by a device-level certificate of the portable device, wherein the device-level certificate is generated and self-signed at the portable device; forward to a controller a request to authenticate the application, the request including the application-level certificate with public key information related to the portable device; receive a request from the controller to form a secure communication channel between the portable device and the controller based on the authenticated application-level certificate, wherein the request indicates that the application has been authenticated based on the application-level certificate; and establish the secure communication channel with the controller, wherein the controller uses the public key information to establish the secure communication channel.

22. The portable device of claim 21, wherein the portable device processor is further configured to receive a registry of services accessible by the portable device, indicate a service to be accessed by the portable device, forward public key information related to the portable device with the application-level certificate to the controller with a request for the indicated service to be accessed, and use the public key information to establish the secure communication channel.

23. The portable device of claim 21, wherein the portable device processor is further configured to generate the application-level certificate by receiving permission for an application on the portable device to access a service, generating the application-level certificate by a brokering service executing on the portable device processor, attaching private key and public key information to the application-level certificate by the brokering service, and storing the application-level certificate on the portable device.

24. The portable device of claim 21, wherein the portable device is commissioned in a network with the controller.

* * * * *